Nov. 26, 1968 SUSUMU SEKI 3,413,614

SEMI-PERMANENT MEMORY DEVICE

Filed July 12, 1965 6 Sheets-Sheet 1

INVENTOR

Susumu Seki

BY Paul M. Craig, Jr.

ATTORNEY

INVENTOR
Susumu Seki

BY Paul M. Craig, Jr.

ATTORNEY

Nov. 26, 1968 SUSUMU SEKI 3,413,614

SEMI-PERMANENT MEMORY DEVICE

Filed July 12, 1965 6 Sheets-Sheet 3

INVENTOR
Susumu Seki

BY Paul M. Craig, Jr.
ATTORNEY

Nov. 26, 1968 SUSUMU SEKI 3,413,614

SEMI-PERMANENT MEMORY DEVICE

Filed July 12, 1965 6 Sheets-Sheet 4

INVENTOR

Susumu Seki

BY Paul M. Craig, Jr.

ATTORNEY

INVENTOR
Susumu Seki

BY Paul M. Craig, Jr.
ATTORNEY

Nov. 26, 1968 SUSUMU SEKI 3,413,614

SEMI-PERMANENT MEMORY DEVICE

Filed July 12, 1965 6 Sheets-Sheet 6

INVENTOR

Susumu Seki

BY Paul M. Craig, Jr.

ATTORNEY

United States Patent Office 3,413,614

Patented Nov. 26, 1968

3,413,614

SEMI-PERMANENT MEMORY DEVICE

Susumu Seki, Kokubunji-shi, Japan, assignor to Hitachi, Ltd., Tokyo, Japan

Filed July 12, 1965, Ser. No. 470,990

Claims priority, application Japan, July 15, 1964, 39/40,593

10 Claims. (Cl. 340—173)

ABSTRACT OF THE DISCLOSURE

A semi-fixed memory device is described which is formed by insulating backing members having a plurality of parallel conductive word drive lines formed thereon to each of which a driving electrical signal is applied. A second set of parallel conductive digit lines are formed on the same or a seprate insulating backing member and are disposed transverse to the word lines with each of the word drive lines having coupling portions with the intersecting digit lines where the coupling portions are arranged substantially parallel to the intersecting digit lines. As a result upon a driving current being supplied to a respective word drive line, an output voltage is electromagnetically induced on the respective intersecting digit line. A plurality of closed loop conductors are selectively disposed at the coupling portions so as selectively to reduce the coupling between the word drive lines and the digit lines. As a consequence, output signals representing as a whole, information in binary form and having a binary pattern corresponding to the distribution of the closed loop conductors, are induced on the digit lines in response to the application of the driving electric signals selectively supplied to the word drive lines. The closed loop conductors preferably are formed on a separable backing member from the backing members on which the word drive lines and digit lines are formed in order that the binary information stored in the semi-fixed memory may be readily changed.

The present invention relates to memory devices which can store semi-fixed programs or data required in electronic digital computers.

Heretofore magnetic drums, ferrite core matrices, or the like have been used for memory devices in a digital computer and these are characterized by the fact that their contents are read and written at will under the control of the main part of the computer. However, it has been found that among the programs and data required by the computer there are a considerable number of those which need not be or even must not be rewritten.

The object of the present invention is to provide an inexpensive, high speed, and reliable semi-fixed memory devices for storing desired informations. According to the present invention the storing is effected by utilizing the fact that the mutual inductance between a word drive line and a digit line varies according to whether a closed loop conductor disposed so as to be interlinked with the main part of the magnetic flux of mutual inductive coupling brought about by arranging the word drive line and the digit line partially in parallel and in proximity to each other is cut or not.

This and other objects and advantages of the present invention will become more apparent from the following description taken in conjunction with the accompanying drawings, in which.

Figures 3A, 3B:
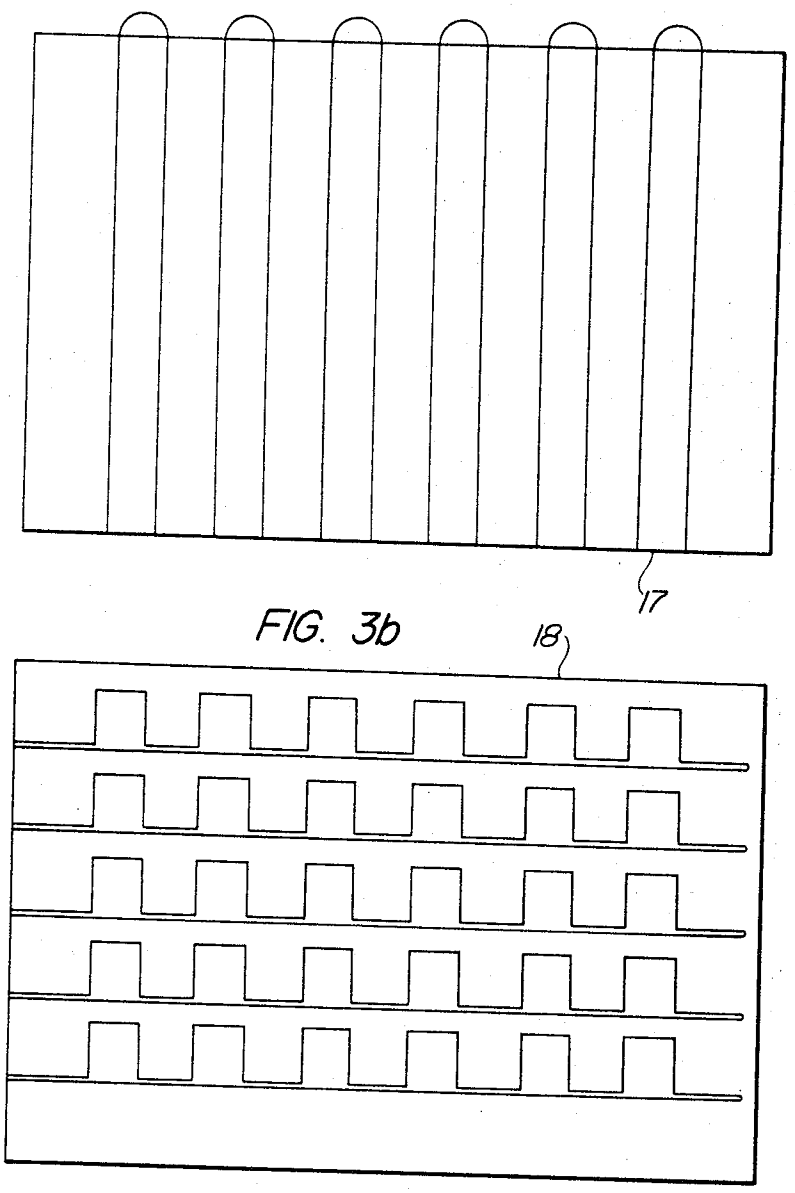
Figure 3C:
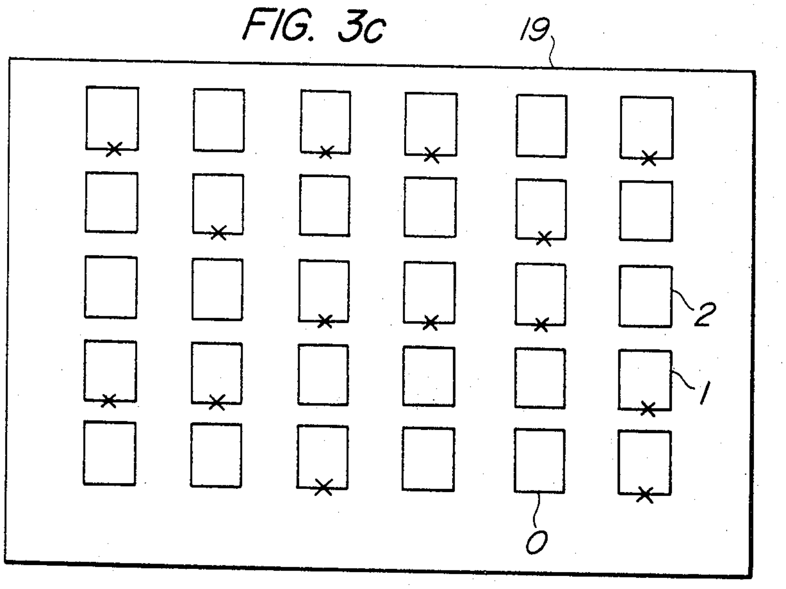
Figure 5:
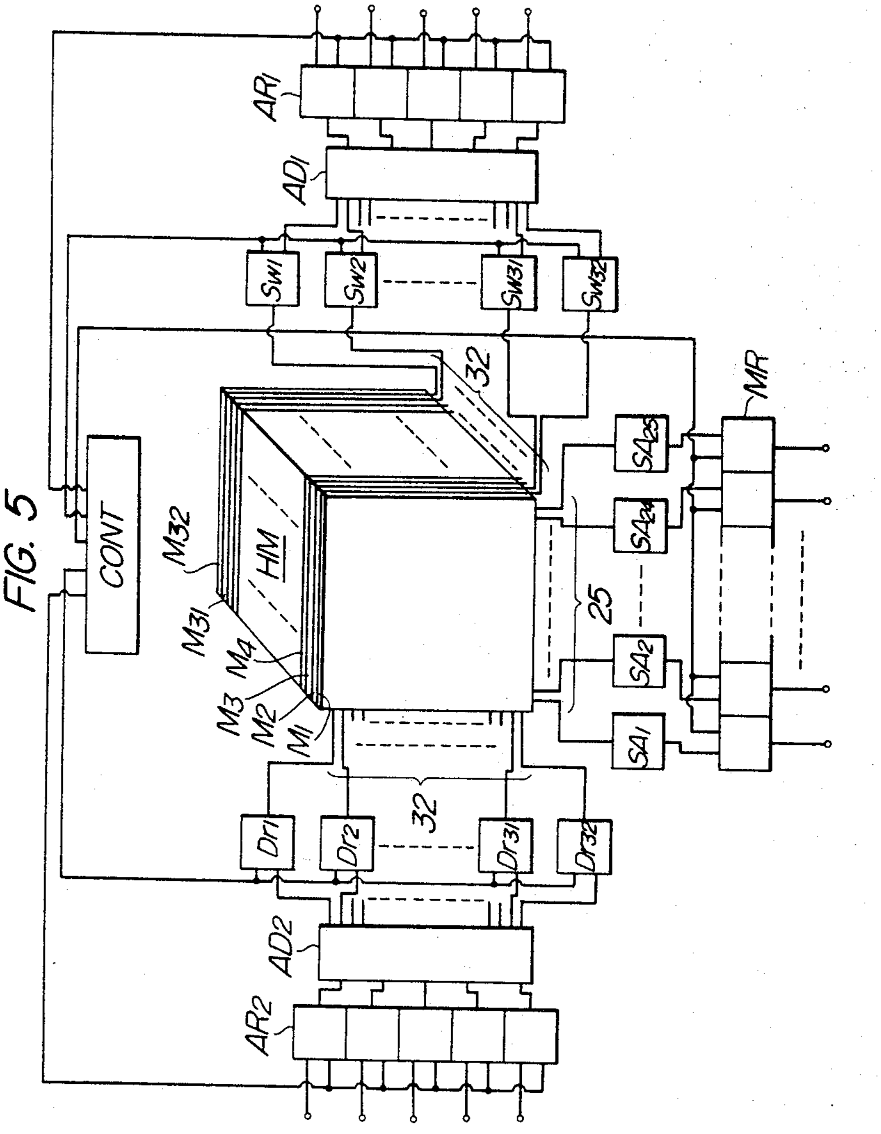
Figure 6:
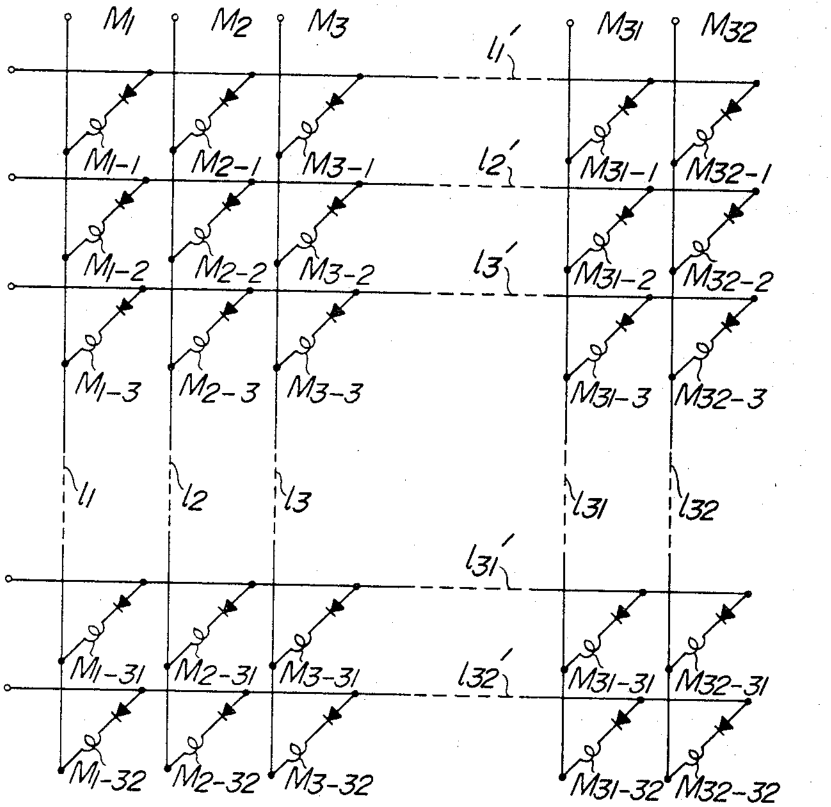

FIGS. 3*a*, 3*b* and 3*c* are views illustrating the structure of a unit memory board;

FIGS. 4*a*, 4*b*, 4*c* and 4*d* are schematic diagrams of embodiments of the invention;

FIG. 5 is a block diagram of an embodiment wherein the semi-fixed memory device of the invention is used; and FIG. 6 is a circuit diagram of a part of the embodiment of FIG. 5.

Figure 1:
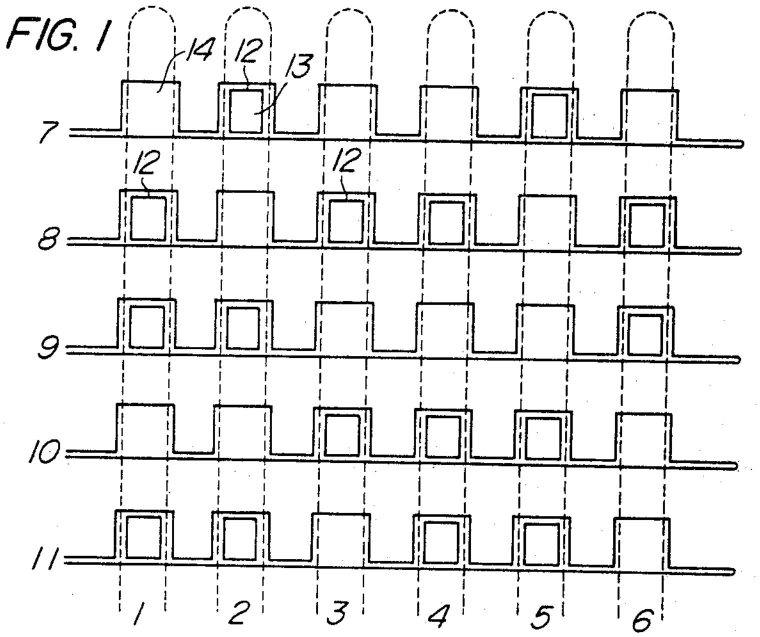
FIG. 1 is a basic explanatory diagram of the present invention.

Referring now to FIG. 1 illustrating the basic principle of the present invention, digit lines 1 to 6 represented by dotted lines are insulated from and disposed adjacent and perpendicular to word driving lines 7 to 11 represented by solid lines, and closed loops 12 represented by solid lines are also insulated from and disposed adjacent to both the digit lines 1 to 6 and the drive lines 7 to 11.

Now denoting the mutual inductance between the word drive lines and the digit lines when there is no closed loop conductors by $M_1$ (henries), the mutual inductance between the word drive lines and the closed loop conductors when there exist the closed conductors by $M'$ (henries), respectively, the mutual inductance between the conductors and the digit lines by $M''$ (henries), and the self inductance of the closed loop conductors by L (henries), respectively, the mutual inductance between the word drive lines and the digit lines is when the closed loop conductors are inexistent:

$$M_1 \text{ (henries)}$$

when the closed loop conductors are existent:

$$M_0 = M_1 - \frac{M'M''}{L} \text{ (henries)}$$

Therefore, the mutual inductance is obviously lower when there exist the closed loop conductors than when there exist no closed loop conductors. According to experiments $M_0$ is capable of being made sufficiently small compared with $M_1$ by inserting the closed loop conductors between the word drive lines and the digit lines or by disposing the closed loop conductors in proximity to the word drive lines on the opposite side to the digit lines. In particular, the arrangement of the closed loop conductors in proximity to the word drive lines over as complete peripheries as possible of the closed loop conductors has a large effect on making $M'$ large, and hence on making $M_0$ smaller than $M_1$. Making the thickness of the closed loop conductors large is also effective in making $M_0$ smaller compared with $M_1$ by making $M'$ larger and at the same time making L smaller. Thus, in each intersecting portion of the digit lines and the word drive lines one of two kinds of bits information is stored according to whether the closed loop conductor is present or not. More specifically, by providing the closed loop conductor, for instance, at the intersecting portion 13 shown in FIG. 1, the information "0" may be stored there, whereas with no provision of the closed loop conductor the information "1" may be stored, for instance, at the intersecting portion 14 in FIG. 1.

Figure 2:
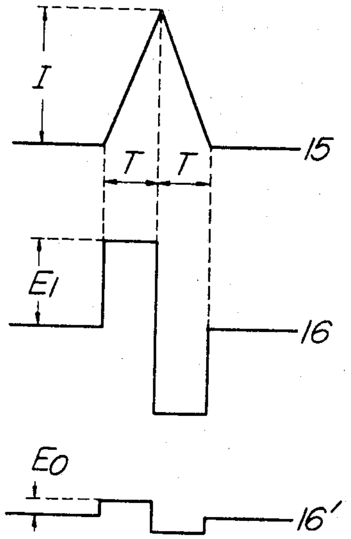
FIG. 2 is a diagram of wave forms of a driving current and a read voltage.

Referring to FIG. 2 illustrating a basic explanatory diagram of wave forms of a driving current and a read-out voltage in the memory circuit according to the present invention, a driving current supplied to one of the word driving lines is represented by a line 15 and a read-out voltage across the appropriate ends of one of the digit lines is represented by line 16 or 16'. Thus when a current pulse varying from 0 to I during a time T and from I to 0 during the succeeding time T is supplied to the word driving line, a read-out voltage of $$E_1 = M_1 I/T \text{ volts}$$

may be obtained on the digit line having the mutual inductance $M_1$ with the word driving line. On the other hand, an output voltage of $$E_0 = M_0 I/T = \left(M_1 - \frac{M'M''}{L}\right) I/T \text{ volts}$$

may be obtained on the digit line having the mutual inductance $M_0$ with the word drive line due to the presence of the closed loop conductor.

For example, when the current pulse 15 shown in FIG. 2 is applied to the word driving line 7 in FIG. 1, voltage variation as represented by 16 in FIG. 2 arises on the digit lines 1, 3, 4 and 6 and voltage variation as represented by 16' in FIG. 2 arises on the digit lines 2 and 5. Thus, it will be seen that 1, 0, 1, 1, 0 and 1 may be read out on the digit lines 1, 2, 3, 4, 5 and 6, respectively, and these have been stored semi-fixedly by providing beforehand the above-mentioned closed loops at the intersecting portions corresponding to the information "0." Similarly, information 0, 1, 0, 0, 1 and 0 may be obtained by driving the word driving line 8, and similar circumstances are the case with all other word driving lines.

Although there is illustrated in FIG. 1 the case of storing five words with six bits for a word, exactly the same principle may apply to the case of storing a desired number of bits or words.

An embodiment of the present invention is illustrated in FIGS. 3*a*, 3*b* and 3*c* wherein a printed circuit board 17 has a group of the digit lines printed on one surface thereof, a printed circuit board 18 has a group of the word driving lines printed on one surface thereof, and a printed circuit board or film 19 has the closed loop conductors printed thereon. For storing the information "1" the corresponding closed loop conductor is cut and made open, while for storing the information "0" the closed loop conductor is kept as it is. In FIG. 3*c* the cuts denoted by the cross mark are made corresponding to FIG. 1.

A semi-fixed memory device based on the aforementioned principle is capable of being constructed with very low cost and with ease by putting the printed board 18 on the printed board 17, and further superposing the printed board or film 19 thereon or by putting the board 18 over the board 17 holding the board or film 19 in between.

Figure 4D:
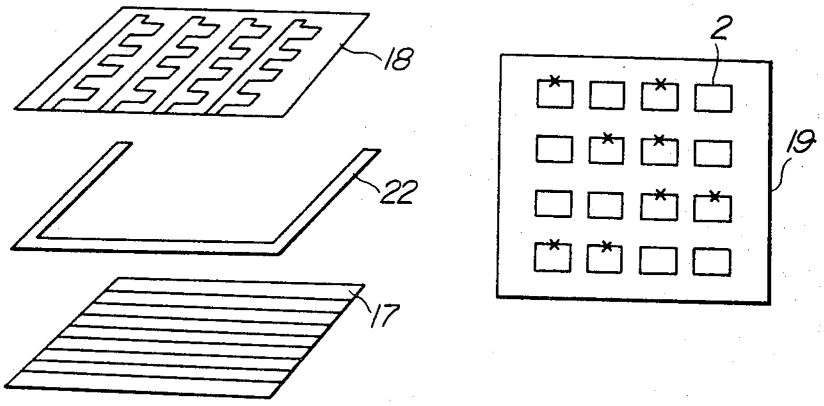
Figure 4A:
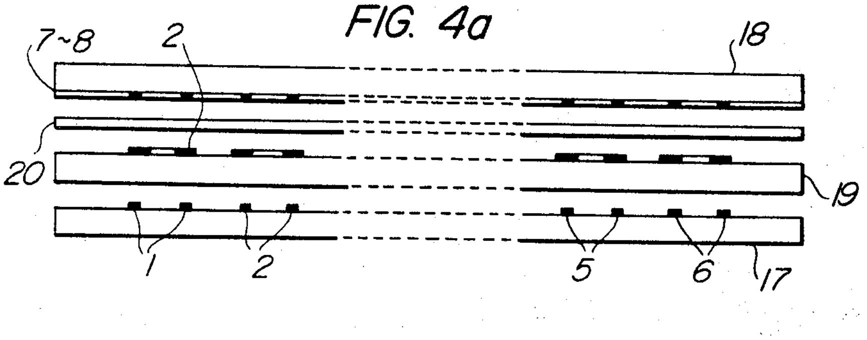
Figure 4B:
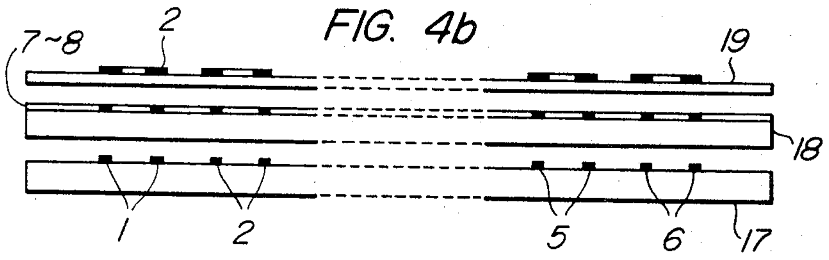
Figure 4C:
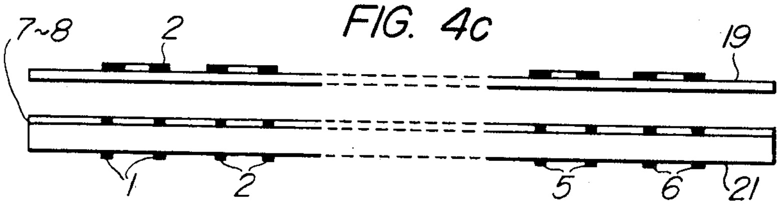

Examples of the superposition are shown in FIGS. 4*a*, 4*b* and 4*c*. In FIG. 4*a* the printed boards 17 and 19, a Mylar film 20 and the printed board 18 are piled up in this order. In FIG. 4*b* the printed board 18 is put on the board 17, and further the thin printed board or film 19 is disposed on the board 18. The embodiment shown in FIG. 4*c* is the substitution of the boards 17 and 18 of FIG. 4*b* by a printed board 21 having the digit lines on one face thereof and the word drive lines on the opposite face thereof. In any case the change of the contents of the memory is readily effected by exchanging the board 19. Since the closed loop conductor board 19 is unnecessary to be connected with an outside circuit, if the use is made of a spacer 22 such as, for example, shown in FIG. 4*d* between the boards 17 and 18 to facilitate the insertion and withdrawal of the board 19, the exchange of the board 19 is very easy.

An example in which a semi-fixed memory device of the invention is practically applied to the memory device in a conventional electronic computer is shown in FIG. 5. Similar application is also disclosed in co-pending U.S. application Ser. No. 293,336, now Patent No. 3,284,781 issued Nov. 8, 1966. The semi-fixed memory device HM of FIG. 5 is composed of a stack of 32 sheets of unit memory boards, each of which is formed by assembling the printed circuit board 17 of FIG. 3*a*, 18 of FIG. 3*b* and 19 of FIG. 3*c* in superposed relation as shown in FIG. 4. Between memory board $M_1$, $M_2$, . . . , $M_{32}$ are disposed shielding means such as magnetic shielding plates (not shown) for the purpose of preventing the noise due to electromagnetic induction between the unit memory boards $M_1$, $M_2$, . . . , $M_{32}$ during reading-out. Each of the unit memory boards $M_1$, $M_2$, . . . , $M_{32}$ has 25 printed digit lines arranged in transverse direction as shown by the printed board 17 of FIG. 3*a* and 32 printed word driving lines arranged in longitudinal direction as shown by the printed board 18 of FIG. 3*b*, and the information "0" or "1" is recorded according to whether or not the said closed loop conductor is as described previously.

With the above arrangement each of the unit memory boards $M_1$, $M_2$, . . . , $M_{32}$ will have the capacity of 32 words, each of which again consists of 25 bits. Accordingly, the semi-fixed memory device HM is of the capacity of 1,024 words.

The connection of the word driving lines of the memory device HM is shown in FIG. 6, and is made outside of each board. In FIG. 6, each of the word driving lines is shown in the form of a coil. There are 1,024 such word driving lines in total. The word driving lines disposed in each column belong to the same unit memory board. For example, the word driving lines $M_{1-1}$, $M_{1-2}$, . . . , $M_{1-31}$ and $M_{1-32}$ of the first column belong to the unit memory board $M_1$ and the word driving lines $M_{3-1}$, $M_{3-2}$, . . . , $M_{3-31}$ and $M_{3-32}$ of the third column belong to the unit memory board $M_3$.

Every one end of the word driving lines of each of the unit memory boards $M_1$, $M_2$, . . . , $M_{32}$ is connected to conductors $l_1$, $l_2$, . . . , $l_{32}$, respectively, while every other end is connected through a diode to conductors $l'_1$, $l'_2$, . . . , $l'_{25}$, respectively. For example, one end of each of the word driving lines $M_{2-1}$, $M_{2-2}$, . . . , $M_{2-31}$ and $M_{2-32}$ of the unit memory board $M_2$ in the second column is connected in common to the conductor $l_2$ and the other end of each of the word driving lines $M_{1-2}$, $M_{2-2}$, . . . , $M_{31-2}$ and $M_{32-2}$ in the second row is connected through the diode to the common conductor $l'_2$. For each of the remaining rows and columns connections are made in the same manner.

The thirty two conductors $l_1$, $l_2$, . . ., $l_{32}$ extending in vertical direction in FIG. 6 are connected to the same number of switching circuits $Sw_1$, $Sw_{21}$, . . ., $Sw_{32}$, respectively, in FIG. 5, and the thirty-two conductors $l'_1$, $l'_2$, . . ., $l'_{32}$ extending in horizontal direction in FIG. 6 are connected to the same number of driving circuits $Dr_1$, $Dr_2$, . . ., $Dr_{31}$ and $Dr_{32}$, respectively, all of them being so arranged that at any instant any desired word driving line may be selectively driven.

Some parts corresponding to those of FIG. 6 are not illustrated in FIG. 5 for simplicity. It is considered that the switching circuits $Sw_1$, $Sw_2$, . . ., $Sw_{32}$ effect to select the corresponding unit memory boards $M_1$, $M_2$, . . ., $M_{32}$, respectively and the driving circuits $Dr_1$, $Dr_2$, . . ., $Dr_{32}$ operate to drive the word driving lines of the selected one of the unit memory boards.

The digit line in each of the unit memory boards $M_1$, $M_2$, . . ., $M_{32}$ of the semi-fixed memory device HM are connected in series for each column. For example, the digit line in the first column of the unit memory board $M_1$ is connected in series to the digit line in the first column of the unit memory board $M_2$, and this digit line is in turn connected in series to the digit line in the first column of the unit memory board $M_3$. Thus the digit lines in the first columns of the remaining unit memory boards $M_4 \sim M_{32}$ are connected in series with each other. Output terminals of this column are drawn from the beginning end of the digit line of the first unit memory board $M_1$ and the terminal end of the digit line of the thirty second unit memory board $M_{32}$. The digit line in the second to the twenty-fifth columns are connected as explained above, and output terminals of them are also drawn in the same manner. The output terminals of these columns are connected to input terminals of read amplifiers $SA_1$, $SA_2$, . . ., $SA_{25}$, respectively, each of which is provided for each column. Each of these read amplifiers is used in common for a set of digit lines in each column.

The switching circuits $Sw_1$, $Sw_2$, . . ., $Sw_{32}$ are connected through an address decoder AD1 to an address register AR1 having the capacity of five bits. The drive circuits $Dr_1$, $Dr_2$, . . ., $Dr_{32}$ are also connected through another address decoder AD2 to an address register AR2. Each of the address registers AR1 and AR2 has an input terminal for receiving address information. The reading amplifiers $SA_1$, $SA_2$, . . ., $SA_{25}$ are connected to a memory register MR being of capacity of 25 bits. The memory register MR includes an output terminal for feeding the read information from the semi-fixed memory device HM.

All of the switching circuits Sw's, the drive circuits Dr's, the address registers AR1 and AR2 and the memory register MR are connected to a control circuit for controlling their operations.

The operation of the whole system shown in FIG. 5 will now be described briefly. Address informations from a computer are fed to the address registers AR1 and AR2 and then through the address decoders AD1 and AD2 to the switching circuits Sw's and the driving circuits Dr's to actuate them. Assuming that the decoded information "1" is given to the switching circuit $Sw_2$ only and the coded information "0" to the remaining switching circuits, only the switching circuit $Sw_2$ is caused to operate and the second unit memory board $M_2$ of the semi-fixed memory device HM is selected to hold the conductor $l_2$ at a low potential. On the other hand, assuming that the decoded information "1" is given to the driving circuits $Dr_2$ only and the coded information "0" to the remaining driving circuits, only the driving circuit $Dr_2$ is caused to operate to hold the conductor $l'_2$ at a high potential. Accordingly, current will flow from the conductor $l_2$ to the conductor $l'_2$ through the word drive line $M_{2-2}$ to drive it. Thus, the word drive line in the second row of the unit memory board $M_2$ will be actuated. In each of the twenty-five digit lines intersecting this word drive line $M_{2-2}$ is induced a voltage corresponding to the formation "0" or "1" depending on whether there is the closed loop conductor or not at the intersection. Each of these induced voltages is read into the memory register MR through the read amplifier.

What I claim is:

1. A semi-fixed memory device comprising: a plurality of parallel conductive word drive lines disposed on a supporting surface to each of which a driving electrical signal is applied; a plurality of parallel conductive digit lines disposed on a supporting surface with the digit lines transverse to said word drive lines, each of said word drive lines having coupling portions with each of said intersecting digit lines, said coupling portions of word drive lines being arranged in proximity and substantially parallel to said intersecting digit lines so that when a driving current flows through a respective word drive line, an output voltage is electromagnetically induced on the intersecting digit lines; and a plurality of closed loop conductors selectively disposed at said coupling portions so as selectively to reduce the coupling between said word drive lines and said digit lines whereby output signals representing, as a whole, information in binary form and having a binary pattern corresponding to the distribution of said closed loop conductors, are induced on said digit lines in response to the application of driving electrical signals selectively supplied to said word drive lines.

2. A semi-fixed memory device according to claim 1 wherein said closed loop conductors are disposed between said drive lines and said digit lines.

3. A semi-fixed memory device according to claim 1 wherein said closed loop conductors are disposed over said word drive lines on the opposite side to said digit lines.

4. A semi-fixed memory device according to claim 3 wherein the surfaces on which the word drive lines and the digit lines are formed, are separated by a least one insulating surface and the closed loop conductors are disposed adjacent the word drive lines on the side of the insulating surface opposite from the digit lines.

5. A semi-fixed memory device according to claim 4 wherein the insulating surface is an insulating supporting member of sufficient thickness to comprise a backing member and the word drive lines and the digit lines are formed on respective opposite surfaces thereof.

6. A semi-fixed memory according to claim 1 wherein the thickness of the closed loop conductors is optimized to improve the response characteristics of the memory.

7. A semi-fixed memory according to claim 1 wherein the closed loop conductors are formed on a supporting surface that is separable from the supporting surface for the word drive lines and the digit lines whereby the binary information stored in the semi-fixed memory may be readily changed.

8. A semi-fixed memory according to claim 1 wherein the closed loop conductors are disposed in proximity to greatest possible extent over the complete periphery of the coupling portions of the word drive lines, the thickness of the closed loop conductors is optimized to improve the response characteristics of the memory, the surfaces on which the word drive lines and the digit lines are formed, are separated by at least one insulating surface and the closed loop conductors are disposed adjacent the word drive lines on the side of the insulating surface opposite from the digit lines, and the closed loop conductors are formed on a supporting surface that is separable from the supporting surfaces for the word drive lines and the digit lines whereby the binary information stored in the semi-fixed memory may be readily changed.

9. A semi-fixed memory device according to claim 8, wherein said closed loop conductors are those which are remaining after cutting undesired ones of a pattern of loop conductors provided on the separable insulating surface in a pattern corresponding to the pattern of said word drive line coupling portions.

10. A semi-fixed memory according to claim 1 wherein the closed loop conductors are disposed in proximity to greatest possible extent over the complete periphery of the coupling portions of the word drive lines.

References Cited

UNITED STATES PATENTS

| | | | |
|---|---|---|---|
| 3,231,875 | 1/1966 | Ishidate | 340—173 |
| 3,253,267 | 5/1966 | Ishidate | 340—173 |
| 3,130,388 | 4/1964 | Renard | 340—173 |
| 3,245,054 | 4/1966 | Byron et al. | 340—173 |
| 3,284,781 | 11/1966 | Takahashi | 340—173 |

OTHER REFERENCES

T. Ishidate, S. Yoshizawa and K. Nagamoni: "Eddy-card Memory—A Semi-Permanent Storage," Proc. E.J.-C.C., pp. 194–208, 1961.

BERNARD KONICK, *Primary Examiner.*

J. F. BREIMAYER, *Assistant Examiner.*